(12) United States Patent
Kim et al.

(10) Patent No.: US 11,306,730 B2
(45) Date of Patent: *Apr. 19, 2022

(54) FAN MOTOR AND METHOD OF MANUFACTURING THE SAME

(71) Applicant: LG Electronics Inc., Seoul (KR)

(72) Inventors: Taekyung Kim, Seoul (KR); Seungjo Baek, Seoul (KR); Sungbae Song, Seoul (KR); Jeongho Lee, Seoul (KR); Younggyu Jung, Seoul (KR); Seongho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 361 days.

This patent is subject to a terminal disclaimer.

(21) Appl. No.: 16/608,047

(22) PCT Filed: Apr. 19, 2018

(86) PCT No.: PCT/KR2018/004539
§ 371 (c)(1),
(2) Date: Oct. 24, 2019

(87) PCT Pub. No.: WO2018/199550
PCT Pub. Date: Nov. 1, 2018

(65) Prior Publication Data
US 2020/0195091 A1    Jun. 18, 2020

(30) Foreign Application Priority Data

Apr. 24, 2017  (KR) .................. 10-2017-0052460

(51) Int. Cl.
*H02K 7/14*    (2006.01)
*F04D 25/06*    (2006.01)
(Continued)

(52) U.S. Cl.
CPC ........... *F04D 29/403* (2013.01); *F04D 25/06* (2013.01); *F04D 29/023* (2013.01);
(Continued)

(58) Field of Classification Search
CPC .... F04D 25/06; F04D 29/162; F04D 29/2222; F04D 29/403; F04D 29/043;
(Continued)

(56) References Cited

U.S. PATENT DOCUMENTS

| 10,598,189 B2 | 3/2020 | Liu et al. |
| 2008/0010986 A1* | 1/2008 | Fuhrmann ............... F02B 39/16 60/598 |

(Continued)

FOREIGN PATENT DOCUMENTS

| CN | 103532299 | 1/2014 |
| FR | 1485115 | 6/1967 |

(Continued)

OTHER PUBLICATIONS

KR Office Action in Korean Appln. No. 10-2017-0052460, dated Jun. 22, 2021, 17 pages (with English translation).

(Continued)

*Primary Examiner* — Kenneth J Hansen
(74) *Attorney, Agent, or Firm* — Fish & Richardson P.C.

(57) ABSTRACT

A fan motor includes: a motor housing; a rotating shaft; a rotor; a stator disposed outside the rotor; an impeller having at least one blade and a hub; and an impeller cover surrounding an outer circumference of the impeller and defining an air suction inlet. The impeller cover includes: a shroud having an inner diameter that expands in an air flow direction; and a non-metallic coating layer coated on an inner circumferential surface of the shroud and having a lower strength than the blade. The non-metallic coating layer includes: a first area having a first thickness; a second area (Continued)

having a second thickness thinner than the first thickness and defining a stepped portion with the first area, thereby minimizing leakage flow caused by the pressure difference from a pressure-side surface to a suction-side surface of the blade to reduce flow path loss and improving efficiency of the fan motor.

20 Claims, 5 Drawing Sheets

(51) Int. Cl.
  *F04D 29/043* (2006.01)
  *F04D 29/40* (2006.01)
  *H02K 15/14* (2006.01)
  *F04D 29/02* (2006.01)
  *F04D 29/16* (2006.01)
  *F04D 29/42* (2006.01)

(52) U.S. Cl.
  CPC ......... *F04D 29/043* (2013.01); *F04D 29/162* (2013.01); *F04D 29/4213* (2013.01); *H02K 7/14* (2013.01); *H02K 15/14* (2013.01); F05D 2230/90 (2013.01); F05D 2300/611 (2013.01); Y10T 29/49329 (2015.01)

(58) Field of Classification Search
  CPC .. F04D 29/289; F04D 29/4213; F04D 29/622; H02K 7/14; H02K 15/14; Y10T 29/4932; Y10T 29/49321; Y10T 29/49329; F01D 11/12; F01D 11/122; F05D 2300/611; F05D 2300/90; F05D 2300/432; F05D 2300/436; F05D 2300/30; F05D 2300/31
  See application file for complete search history.

(56) References Cited

U.S. PATENT DOCUMENTS

| | | | |
|---|---|---|---|
| 2013/0004305 | A1 | 1/2013 | Giovannetti et al. |
| 2014/0093366 | A1* | 4/2014 | Otsuka ................ F04D 29/666 |
| | | | 415/206 |
| 2015/0204347 | A1 | 7/2015 | Strock et al. |
| 2017/0051755 | A1 | 2/2017 | Liu et al. |

FOREIGN PATENT DOCUMENTS

| | | |
|---|---|---|
| JP | H06113491 | 4/1994 |
| JP | H10252693 | 9/1998 |
| JP | 2016169613 | 9/2016 |
| KR | 20120095407 | 8/2012 |
| KR | 1020130091841 | 8/2013 |
| KR | 20170022920 | 3/2017 |

OTHER PUBLICATIONS

Extended European Search Report in EP Appln. No. 18790307.5, dated Dec. 14, 2020, 10 pages.

* cited by examiner

FAN MOTOR AND METHOD OF MANUFACTURING THE SAME

CROSS-REFERENCE TO RELATED APPLICATIONS

This application is a National Stage application under 35 U.S.C. § 371 of International Application No. PCT/KR2018/004539, filed on Apr. 19, 2018, which claims the benefit of Korean Patent Application No. 10-2017-0052460, filed on Apr. 24, 2017. The disclosures of the prior applications are incorporated by reference in their entirety.

TECHNICAL FIELD

The present disclosure relates to a fan motor and a method of manufacturing the same, and more particularly, to a fan motor having an impeller cover surrounding an outer circumference of the impeller and a method of manufacturing the same.

BACKGROUND ART

A fan motor may be installed in a household appliance such as a cleaner, an air conditioner or a washing machine, or an automobile to generate air flow.

When installed in a household appliance such as a cleaner, the fan motor may generate a suction force for sucking air into a dust collecting part.

One example of such a fan motor may include a motor, an impeller connected to the motor, and an impeller cover surrounding an outer circumference of the impeller.

The impeller may be connected to a rotating shaft of the motor, and may rotate inside the impeller cover to suck air into the impeller cover when the rotating shaft is rotated.

An example of the fan motor may function as a vacuum suction unit when mounted in a vacuum cleaner, and Republic of Korea Patent Publication No. 10-2013-0091841 A (published on Aug. 20, 2013) discloses a vacuum suction unit including a motor, an impeller connected to the motor through a rotating shaft to suck air by rotation, and an impeller cover (fan cover) covering the impeller and having a suction port through which air is sucked.

The impeller may include a plurality of blades, and the impeller may be mounted such that a tip clearance is provided between the blades and an inner circumferential surface of the impeller cover.

When the tip clearance is too small, the blades or impeller cover may be worn. When the tip clearance is too large, leakage flow over the tips of the blades may be excessive and the efficiency of the fan motor may be reduced.

DISCLOSURE

Technical Problem

An object of the present disclosure is to provide a fan motor capable of minimizing leakage flow between an impeller and a shroud to improve efficiency and a method of manufacturing the same.

Another object of the present disclosure is to provide a fan motor capable of maintaining an air gap between the impeller and the impeller cover to a minimum with a simple structure and a method for manufacturing the same.

Technical Solution

According to an embodiment, a fan motor includes a motor housing; a rotating shaft; a rotor mounted on the rotating shaft; a stator disposed within the motor housing to surround the rotor; an impeller having at least one blade formed on an outer surface of a hub connected to the rotating shaft; an impeller cover configured to surround an outer circumference of the impeller and having an air suction port formed therein, wherein the impeller cover includes a shroud with inner diameter expands in an air flow direction; and a non-metallic coating layer coated on an inner circumferential surface of the shroud and having a lower strength than that of the blade. The maximum diameter of the impeller is larger than a diameter of the air suction port.

The non-metallic coating layer may include a first area having a first thickness, and a second area having a second thickness thinner than the first thickness and having a stepped portion with the first area.

The non-metallic coating layer may include a synthetic resin material.

The blade may face the second area in a radial direction of the impeller.

An axial height of the non-metallic coating layer may be higher than a height of the impeller.

The non-metallic coating layer may surround an entire outer circumferential surface of the impeller.

The second area may be continuous to the first area in an air flow direction. Furthermore, the non-metallic coating layer may further include a third area having the first thickness and disposed continuously to the second area in an air flow direction.

A blade tip receiving groove may be formed to be recessed between a boundary portion of the first and second areas and a boundary portion of the second and third areas, at least a part of a blade tip being received in the blade tip receiving groove.

A maximum distance between a central axis of the impeller and the blade tip of the blade may be larger than a radius of the air suction port.

The second thickness of the second area may vary in the air flow direction and an average thickness of the second area may be thinner than the first thickness of the first area.

The second thickness of the second area may vary in the air flow direction and an average thickness of the second area may be thinner than the first thickness of the first area.

An example of the shroud may include a small diameter portion in which the air suction port is formed, a large diameter portion having an inner diameter larger than the small diameter portion, and an expansion portion connecting the small diameter portion and the large diameter portion and having an inner diameter that expands as it is closer to the large diameter portion, and the second area may be formed on an inner surface of the small diameter portion and an inner surface of the expansion portion, respectively, or may be formed on the inner surface of the expansion portion.

The shroud may include a large diameter portion and an expansion portion having an inner diameter that expands as it is closer to the large diameter portion, and the second area may be formed on an inner surface of the small diameter portion.

According to an embodiment, a method of manufacturing a fan motor includes manufacturing an impeller cover by forming a non-metallic coating layer having a first thickness on an inner circumferential surface of a shroud with inner diameter expands in an air flow direction; rotating the impeller while inserting an impeller having a blade formed in the hub into the impeller cover; and coupling the impeller cover to a motor housing, wherein the non-metallic coating layer is a material with strength is lower than that of the blade, and the blade grinds a part of the non-metallic coating layer to have a second thickness thinner than the first thickness during rotation of the impeller.

The blade may include a PEEK material.

The non-metallic coating layer may include a Teflon material. The non-metallic coating layer may include an ETFE material.

The non-metallic coating layer may be electrostatically printed on an inner circumferential surface of the shroud.

The first thickness may be in a range of 0.1 mm to 0.6 mm.

Advantageous Effects

According to the embodiments of the present disclosure, the flow path loss may be reduced by minimizing the leakage flow caused by the pressure difference from the pressure-side surface to the suction-side surface, and the efficiency of the fan motor may be improved.

In addition, even when there is a blade injection molding error and an assembly tolerance of the fan motor, the error or the tolerance may be compensated according to the grinding depth of the non-metallic coating layer, and reliability is improved because a minimum air gap is maintained.

In addition, even when the impeller approaches the non-metallic coating layer due to increase in the thrust of the impeller during the use of the fan motor, it is possible to cope with the increase in the thrust because a portion of the remaining non-metallic coating layer is ground.

MODE FOR INVENTION

Hereinafter, specific embodiments of the present disclosure will be described in detail with reference to the drawings.

Figure 1:
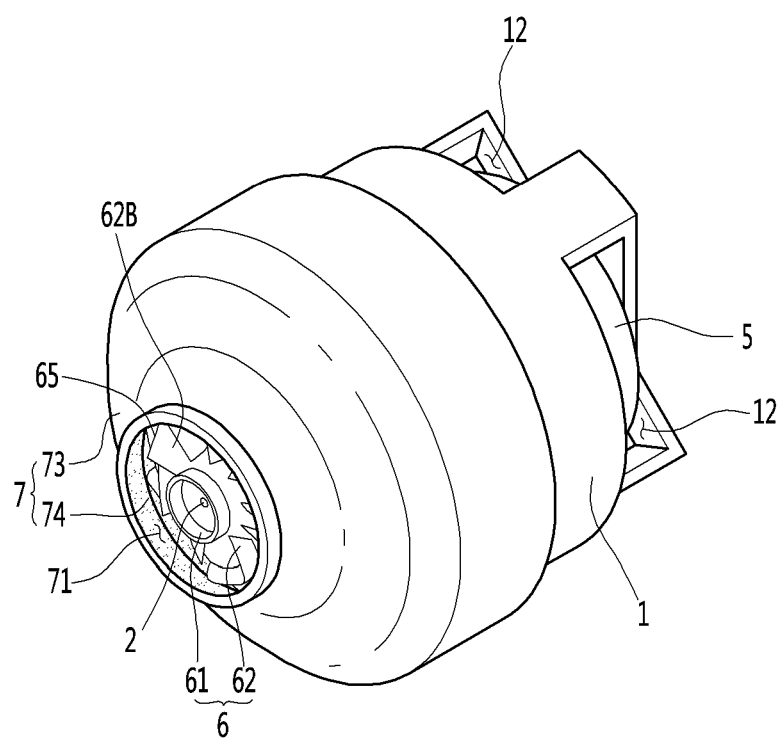
FIG. 1 is a perspective view of a fan motor according to an embodiment of the present disclosure.
Figure 2:
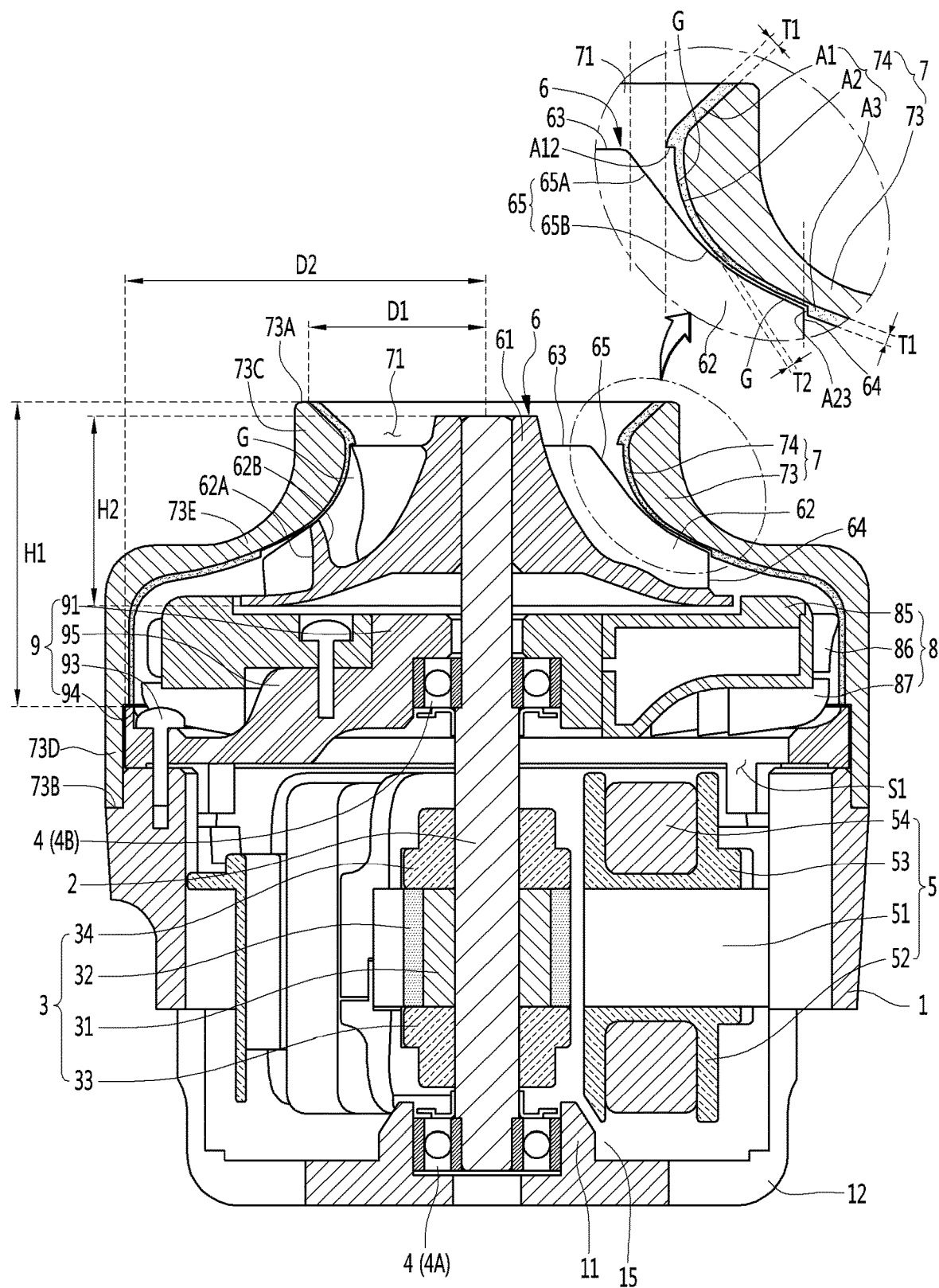
FIG. 2 is a cross-sectional view showing the inside of the fan motor shown in FIG. 1.
Figure 3:
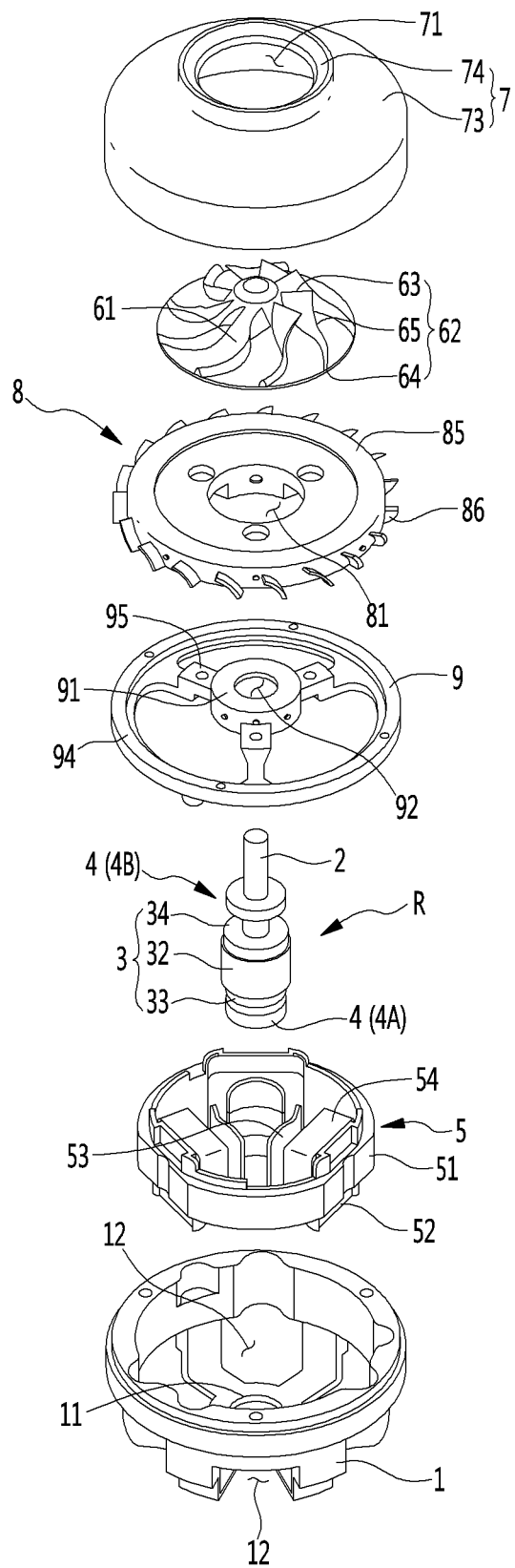
FIG. 3 is an exploded perspective view of a fan motor according to an embodiment of the present disclosure.

FIG. 1 is a perspective view of a fan motor according to an embodiment of the present disclosure, FIG. 2 is a cross-sectional view showing the inside of the fan motor shown in FIG. 1, and FIG. 3 is an exploded perspective view of a fan motor according to an embodiment of the present disclosure.

A fan motor of the present embodiment may include a motor housing 1, a rotating shaft 2, a rotor 3 mounted to the rotating shaft 2, a stator 5 disposed inside the motor housing 1 and surrounding the rotor 3, an impeller 6 connected to the rotating shaft 2, and an impeller cover 7 surrounding an outer circumference of the impeller 6. In addition, the impeller cover 7 may include a non-metallic coating layer 74 to minimize a tip clearance "G" between the impeller 6 and the impeller cover 7.

The motor housing 1 may be formed with a space S1 in which the rotor 3 and the stator 5 are received.

The motor housing 1 may be formed with a bearing housing portion 11 for supporting the bearing 4 to be described later.

In the motor housing 1, an air discharge port 12 through which the air flowing into the space S1 by the impeller 6 is exhausted to the outside may be formed.

The rotor 3 and the bearing 4 may be mounted on the rotating shaft 2, and the rotating shaft 2 may constitute a rotating shaft assembly R together with the rotor 3 and the bearing 4.

The rotating shaft 2 may be disposed to extend from the inside of the motor housing 1 to the inside of the impeller cover 7. A part of the rotating shaft 2 may be located inside the motor housing 1 and the rest of the rotating shaft 2 may be located inside the impeller cover 7. The rotating shaft 2 may be rotatably positioned inside the motor housing 1 and inside the impeller cover 7.

The rotating shaft 2 is rotated together with the rotor 3 and may be supported by the bearing 4. The rotating shaft 2 may be rotated by the rotor 3 while being supported by the bearing 4.

The impeller 6 may be connected to the rotating shaft 2, and the impeller 6 may be rotated inside the impeller cover 7 when the rotating shaft 2 is rotated.

The rotor 3 may be mounted to surround a part of the rotating shaft 2. The rotor 3 may be rotatably positioned inside the stator 5. The rotor 3 may be formed in a hollow cylindrical shape.

The rotor 3 may include a rotor core 31 fixed to the rotating shaft 2, a magnet 32 installed on the rotor core 31, and a pair of end plates 33 and 34 for fixing the magnet 32.

The rotor 3 may be mounted to surround a portion between one end and the other end of the rotating shaft 2.

At least one bearing 4 may be installed on the rotating shaft 2. A pair of bearings 4A and 4B may be provided on the rotating shaft 2.

Any one 4A of the pair of bearings 4 may be supported by a bearing housing portion 11 formed in the motor housing 1.

The other one 4B of the pair of bearings 4 may be supported by a bearing housing portion 91 formed in a motor bracket 9.

The stator 5 may be mounted to the motor housing 1. The stator 5 may be arranged to surround the rotor 3 in the motor housing 1. The stator 5 may be mounted to the motor housing 1 via a fastening member such as a screw.

The stator 5 may be formed in a hollow cylindrical shape. The stator 5 may be mounted to surround an outer circumference of the rotor 3.

The stator 5 may be composed of a combination of a plurality of members. The stator 5 may include a stator core 51, a pair of insulators 52 and 53 coupled to the stator core 51, and a coil 54 disposed on the insulators 52 and 53.

The impeller 6 may be composed of a centrifugal impeller that sucks air in the axial direction and blows air in the centrifugal direction or may be composed of a cross-flow impeller that sucks air in the axial direction and blows air in the inclined direction between the axial direction and the centrifugal direction.

The impeller 6 may include a hub 61 connected to the rotating shaft 2 and at least one blade 62 formed on an outer surface of the hub 61.

The hub 61 may be connected to an end of the rotating shaft 2 located inside the impeller cover 72.

A hollow portion into which the rotating shaft 2 is inserted may be formed at the center of the hub 61.

The hub 61 may be formed in a shape of which an outer diameter gradually expands in a direction closer to the rotor 3.

The hub 61 may have the smallest outer diameter at one end close to the air suction port 71 and the largest outer diameter at the other end close to the rotor 3. The largest outer diameter of the hub 61 may be the outer diameter of an end close to the rotor 3 among both ends of the hub 61.

A plurality of blades 62 may be formed on the outer surface of the hub 61, the plurality of blades 62 may be spaced apart from each other in the circumferential direction of the impeller 6.

The blade 62 may be formed in a curved plate-like shape, and both surfaces thereof may include a pressure-side surface and a suction-side surface.

The blade 62 may be formed in a three-dimensional shape, and may include a leading edge 63 at a front end in an air flow direction and a trailing edge 64 at a rear end in the air flow direction.

The blade 62 may have a blade tip 65 positioned at the outermost side with respect to the central axis of the hub 61. The blade tip 65 may be an outer tip positioned at the outermost of the blade 62.

In the blade 62, the leading edge 63 is connected to the trailing edge 64 via the blade tip 65. The blade tip 65 may connect a tip of the leading edge 63 farthest to the hub 61 and a tip of the trailing edge 64 farthest to the hub 61.

The blade tip 65 may include an air suction port facing area 65A facing the air suction port 71 in the axial direction and a non-metallic coating layer facing area 65B facing the non-metallic coating layer 74 in the axial direction.

The blade tip 65 may all face the non-metallic coating 74 in the radial direction.

During rotation of the impeller 6, a part of the air flowing by the impeller 6 may pass over the blade tip 65 due a pressure difference between the pressure-side surface 62A and the suction-side surface 62B of the blade 62 and the flow may be a leakage flow.

When the impeller 6 is rotated, the periphery of the pressure-side surface 62A may be at a relatively high pressure, the periphery of the suction-side surface 62B may be at a relatively low pressure, and when a tip clearance between the blade tip 65 and the inner circumferential surface of the impeller cover 7 is large, the air around the pressure-side surface 62A may pass over the blade tip 65 to move to the periphery of the suction-side surface 62B, and vortex may be formed around the suction-side surface 62B.

When the tip Clearance between the blade tip 65 and the impeller cover 7 is large, the amount of leakage flow becomes large, and the tip clearance may be preferably set to minimize the leakage flow.

The impeller cover 7 may include a non-metallic coating 74 to minimize this leakage flow. The non-metallic coating layer 74 may be preformed in the shroud 73 in advance prior to assembly of the fan motor, and during assembly of the fan motor, a part thereof may be shaved off by the blade 62 of the impeller 6.

Hereinafter, the impeller cover 7 will be described in detail.

An air suction port 71 may be formed in the impeller cover 7. When the impeller 6 is rotated, air outside the fan motor may be sucked into the impeller cover 7 through the air suction port 71.

The impeller cover 7 may include a shroud 73 with inner diameter expands in the air flow direction and a non-metal coating layer 74 coated on the inner circumferential surface of the shroud 73.

The shroud 73 may guide suction of air to the impeller 6 and may have a structure in which an inner radius D1 at one end 73A and an inner radius D2 at the other end 73B are different from each other. The shroud 73 may be formed such that the inner radius D2 at the other end 73B is greater than the inner radius D1 at the one end 73A.

The shroud 73 may have an inner diameter that gradually expands from one end 73A to the other end 73B.

In an example of the shroud 73, the entire area between one end 73A and the other end 73B may be formed such that the inner diameter gradually expands in the air flow direction. The impeller 6 may be located inside the shroud 73 and the whole of the blade tip 65 may face the shroud 73 in the radial direction.

Another example of the shroud 73 may include a small diameter portion 73C, a large diameter portion 73D and an extension portion 73E, as shown in FIG. 2.

The small diameter portion 73C may include one end 73A of the shroud 73 and its inner diameter may be smaller than the inner diameter of the large diameter portion 73D. An air suction port 71 through which air outside the fan motor flows into the shroud 73 may be formed inside the small diameter portion 73C.

The large diameter portion 73D may include the other end 73B of the shroud 73 and its inner diameter may be larger than the inner diameter of the small diameter portion 73C.

The expansion portion 73E connects the small diameter portion 73C and the large diameter portion 73D, and may be formed such that its inner diameter is gradually expanded. The expansion portion 73E may be located between the small diameter portion 73C and the large diameter portion 73D in the air flow direction, and air may flow into the expansion portion 73E through the inside of the small diameter portion 73C and may flow from the expansion portion 73E into the large diameter portion 73D.

In addition, the impeller 6 may be located inside the small diameter portion 73C and inside the expansion portion 73E, and a partial area of the blade tip 65 may face the small diameter portion 73C in the radial direction, and the other area of the blade tip 65 may face the extension portion 73E in the radial direction.

As still another example of the shroud 73, the shroud 73 may include the large diameter portion 73D and the expansion portion 73E without the small diameter portion 73C. In this case, the extension portion 73E may include one end 73A of the shroud 73 and the air suction port 71 through which external air is sucked into the fan motor may be formed in the expansion portion 73E, and the inner diameter of the expansion portion 73E may be formed to expand gradually as it is closer to the large diameter portion 73D. In addition, the impeller 6 may be located inside the expansion portion 73E, and the blade tip 65 may face the expansion portion 73E in the radial direction.

The non-metallic coating layer 74 may preferably have a strength such that a portion thereof is shaved off by the blade 62 in the case of assembly of the fan motor. The non-metallic coating layer 74 may be a kind of self sacrificial coating. The non-metallic coating layer 74 may include a material such that the strength of the non-metallic coating layer 74 is smaller than that of the blade 62. The non-metallic coating layer 74 may be preferably made of a soft material having a strength of 80% or less of the strength of the blade 62 so as to minimize damage to the blade 62. The non-metallic coating layer 74 may preferably have a strength of from 30% to 80% of the strength of the blade 62. The non-metallic coating layer 74 may be preferably made of a synthetic resin material, and may be preferably formed of a synthetic resin material of less strength than the material of the blade 62.

The non-metallic coating layer 74 may not be ground by a separate grinding process, but may be ground by the blade 62 when the fan motor is assembled.

The non-metallic coating layer 74 may be preferably coated to cover a part of the leading edge 63, the entire blade tip 65, and a part of the trailing edge 64 in the air flow direction.

To this end, a height (H1, a axial length of the non-metallic coating layer) of the non-metallic coating layer 74 may be higher than a height (H2, a axial length of the impeller) of the impeller 6. Here, each of the height H1 of the non-metallic coating layer 74 and the height H2 of the impeller 6 may be an axial length of the fan motor. In addition, when the fan motor is assembled, the non-metallic coating layer 74 may be disposed to surround the entire outer circumferential surface of the impeller 6.

As shown in FIG. 2, the non-metallic coating layer 74 may include a first area A1 having a first thickness T1 and a second thickness T2 thinner than the first thickness T1 and a second area A2 having a stepped portion with the first area A1.

The second area A2 may be continuous to the first area A1 in the air flow direction. In addition, the non-metallic coating layer 74 may further include a third area A3 that has the first thickness T1 and is continuous to the second area A2.

The non-metal coating layer 74 may be coated with a uniform thickness in the air flow direction before the fan motor is assembled.

The non-metallic coating layer 74 may be coated with the first thickness T1 on the inner circumferential surface of the shroud 73 before assembling the fan motor, and the blade 62 may contact a portion of the non-metallic coating layer 74 when the impeller 6 is rotated. In this case, the portion of the non-metallic coating layer 74 that contacts the blade 62 may be ground by the blade 62.

The portion of the non-metallic coating layer 74 that is in contact with the blade 62 may be reduced in thickness from the first thickness T1 to the second thickness T2, and a portion of the non-metallic coating layer 74 that is not in contact with the blade 62 may be maintained at the first thickness T1.

The portion of the non-metallic coating layer 74 that is not ground by the blade 62 may be the first area A1 and the third area A3 having the first thickness T1, and the portion of the non-metallic coating layer 74 that is left after being ground by the blade 62 may be the second area A2 having the second thickness T2.

On the other hand, the second thickness T2 of the second area A2 may be uniform or may vary in the air flow direction.

When the second thickness T2 of the second area A2 varies in the air flow direction, the thickness of the thickest portion of the second area A2 may be thinner than the first thickness T1 of each of the first area A1 and the third area A3. In addition, when the second thickness T2 of the second area A2 varies in the air flow direction, the average thickness of the second area A2 may be thinner than each of the first thickness T1 of the first area A1 and the first thickness T1 of the first area A3.

In addition, the first thickness T1 of the first area A1 may be uniform or may vary in the air flow direction. The first thickness T1 of the third area A1 may be uniform or may vary in the air flow direction.

When the thickness of the first area A1 and the thickness of the third area A3 are different from each other in the air flow direction, the thickness of the thickest portion of the second area A2 may be thinner than each of the average thickness of the first area A1 and the average thickness of the third first area A3. The average thickness of the second area A2 may be thinner than each of the average thickness of the first area A1 and the average thickness T3 of the third area A3.

The largest outer diameter of the impeller 6 may be larger than the diameter of the air suction port 71.

The largest outer diameter of the impeller 6 may be larger than the smallest inner diameter of the small diameter portion 73C and smaller than the largest inner diameter of the expansion portion 73E.

The largest outer diameter of the impeller 6 may be larger than the largest outer diameter of the hub 61 and the largest outer diameter of the blade 62.

Here, the largest outer diameter of the blade 62 may be twice the largest distance from the central axis of rotation of the impeller 6 to the blade tip 65.

The blade tip 65 may be far away from the central axis of rotation of the impeller 6 as it gets closer to the rotor 3, and the largest outer diameter of the blade 62 may be twice a distance from the central axis of rotation of the impeller 6 to a tip farthest from the hub 61 of the blade tips 65.

That is, the largest distance between the central axis of the impeller 6 and the blade tip 65 may be the largest radius of the impeller 6, and the largest radius of the impeller 6 may be larger than the largest radius of the air suction port 71.

The blade 62 of the impeller 6 may face each of the small diameter portion 73C and the expansion portion 73E, and a part of the portion coated on the inner circumferential surface of the small diameter portion 73C and a part of the portion coated on the inner circumferential surface of the extension portion 73E may be ground by the blade 62.

In the grinding by the blade 62 as described above, the first area A1 and the third area A3, which are portions not ground by the blade 62 may be spaced apart from each other with the second area A2, which is the portion ground by the blade 62 disposed therebetween.

The blade 62 of the impeller 6 may face the second area A2 in the radial direction of the impeller 6.

When the shroud 73 includes both the small diameter portion 73C, the large diameter portion 73D, and the expansion portion 73E, the second area A2 is formed on the inner surface of the small diameter portion 73C and the inner surface of the expansion portion 73E or may be formed on the inner surface of the extension portion 73E. In this case, the second area A2 may be formed on a portion of the inner surface of the small diameter portion 73C, and may be formed on a portion of the inner surface or the entire inner surface of the expansion portion 73E.

On the other hand, when the shroud 73 does not include the small diameter portion 73C and includes the large diameter portion 73D and the expansion portion 73E, the second area A2 may be formed on the inner surface of the expansion portion 73E. In this case, the second area A2 may be formed on a portion of the inner surface of the expansion portion 73E.

Hereinafter, the material of the blade 62 and the material of the non-metallic coating layer 74 will be described.

The blade 62 may be made of a nonmetal material.

The blade 62 may be made of polyether ether ketone material (herein after, referred to as PEEK).

The blade 62 may be injection-molded integrally with the hub 61, and in this case, the impeller 6 may be entirely made of non-metallic material, in particular PEEK material.

The PEEK is an engineering plastic developed by ICI, UK, and is an engineering plastic with excellent heat resistance, toughness and salt resistance.

The blade 62 may be made of PEEK 1000, PEEK HPV, PEEK GF30, PEEK CA30, and the like, and may have a tensile strength of 100 MPa, an elongation of 55%, and a compressive strength of 128 Mpa.

The non-metallic coating layer 74 may be lower in strength than the impeller 6, in particular, the blade 62, which is made of a non-metallic material, and may be ground by the blade 62.

It is preferable that the non-metallic coating layer 74 is soft material with a strength is 80% or less of the strength of the blade. The non-metallic coating layer 74 may be made of synthetic resin.

The non-metallic coating layer 74 may be preferably coated with a Teflon material of Polytetra Fluoro Ethylene (PTFE) or ethylene TetraFluoroEthylene (hereinafter referred to as ETFE) having a lower strength than that of PEEK, or a material having a low bending strength such as silicon.

The non-metallic coating layer 74 may be made of only a Teflon material such as PTFE or ETFE, and may be made of a Teflon composite including a Teflon material. Hereinafter, both the Teflon material and the Teflon composite will be referred to as Teflon material.

On the other hand, the non-metallic coating layer 74 may be preferably made of ETFE material. The ETFE is a copolymer of Ethylene and TetraFluoroEthylene. The ETFE has high strength, ultra light weight and strong durability to withstand strong airflow among fluorocarbon resins. The ETFE may have a tensile strength of 26 Mpa, an elongation of 400%, a compressive strength of 49 Mpa, and a portion of PEEK material, that contacts the blade 62 may be ground.

The non-metallic coating layer 74 may be preferably formed to have a thickness considering the depth of grinding by the blade 62 and the assembly tolerance of the impeller 6 without significantly increasing the weight of the fan motor, and the first thickness T1 may be in a range from 0.1 mm to 0.6 mm.

The first thickness T1 of the non-metallic coating layer 74 may be more preferably in a range from 0.2 mm to 0.3 mm. When the tip clearance between the blade tip 65 and the impeller cover 7 in the radial direction is 0.2 mm, the non-metallic coating layer 74 may be coated with the first thickness in the range from 0.2 mm to 0.3 mm.

On the other hand, the fan motor may further include a diffuser 8 for guiding the air flowing by the impeller 6. The air flowing in the impeller 6 may be guided by the diffuser 8.

The diffuser 8 may be disposed inside the impeller cover 7. The diffuser 8 may be mounted to at least one of the motor housing 1 and the motor bracket 9 to be described later. A gap through which air guided by the diffuser 8 passes may be formed between the diffuser 8 and the impeller cover 7.

A part of the diffuser 8 may face the impeller 6, and a gap may be formed between one surface of the diffuser 8 and a diffuser-facing surface of the impeller 6.

The diffuser 8 may be formed with a hollow portion 81 surrounding the outer circumferential surface of the bearing housing portion 9.

The diffuser 8 may include a body portion 85 smaller in size than the impeller cover 7 and positioned inside the impeller cover 7, and a diffuser vane 86 protruding from the outer circumference of the body portion 85.

The body portion 85 may guide the air blown in the centrifugal direction from the impeller 6 to the inner circumferential surface of the impeller cover 7 in a state of being located between the impeller 6 and the stator 5 and air passing between the outer circumferential surface of the body portion 85 and the inner circumferential surface of the impeller cover 7 may be guided between the body portion 85 and the stator 5.

The diffuser vanes 86 may protrude from the body portion 85 to be positioned between the outer circumferential surface of the body portion 85 and the impeller cover 7. The diffuser vane 86 may convert the dynamic pressure of the air passing through the impeller 6 into the static pressure.

The diffuser 8 may further include a guide vane 87 for guiding air to the rotor 3 and the stator 5. The guide vane 87 may be formed after the diffuser vane 86 in the air flow direction.

In addition, the fan motor may further include a motor bracket 9 supporting the bearing 4.

The motor bracket 9 may be coupled to at least one of the motor housing 1 and the diffuser 8. The motor bracket 9 may be formed with a bearing housing portion 91 for accommodating the bearing 4. A rotating shaft through hole 92 through which the rotating shaft 2 passes may be formed in the bearing housing 91.

The motor bracket 9 may be mounted to the motor housing 1. The motor bracket 9 may include a fastening portion 94 fastened to the motor housing 1 through a fastening member 93 such as a screw. The motor bracket 9 may include at least one connection portion 95 connecting the fastening portion 94 and the bearing housing portion 91.

Figure 4:
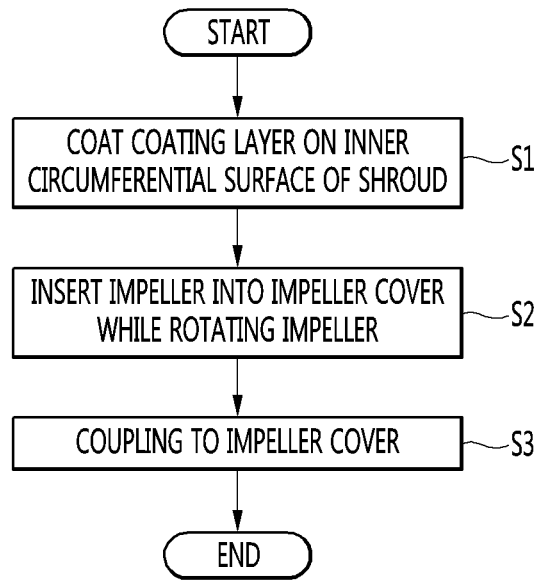
FIG. 4 is a flowchart of a method of manufacturing a fan motor according to an embodiment of the present disclosure.
Figure 5:
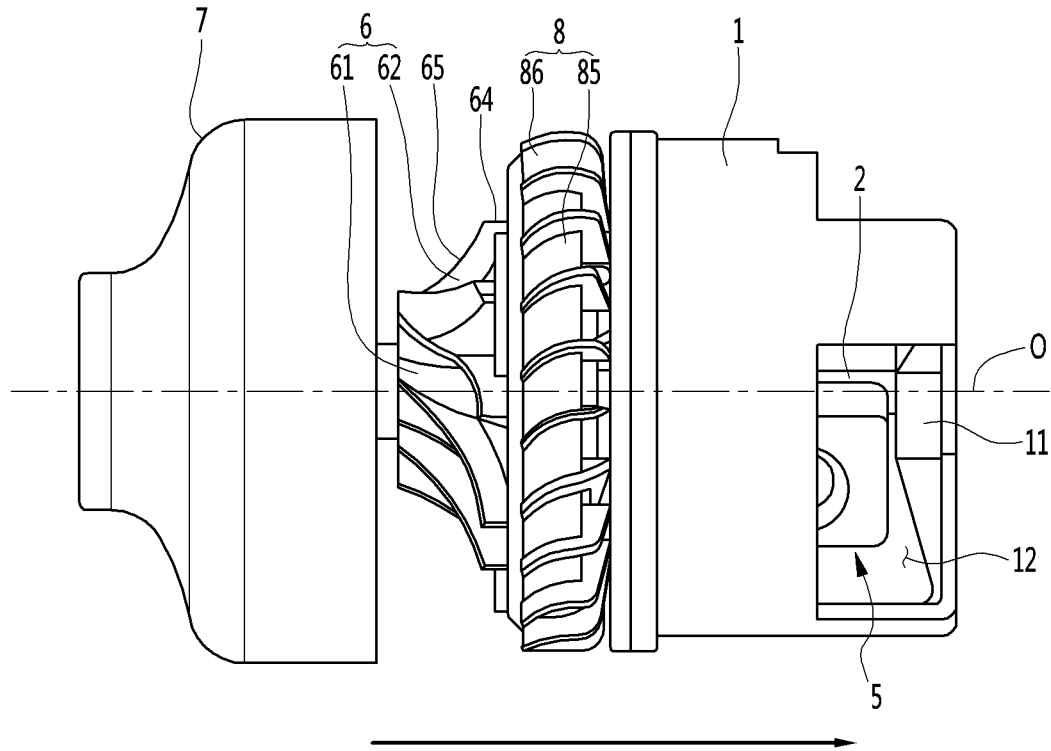
FIG. 5 is a side view before assembly of a fan motor according to an embodiment of the present disclosure.
Figure 6:
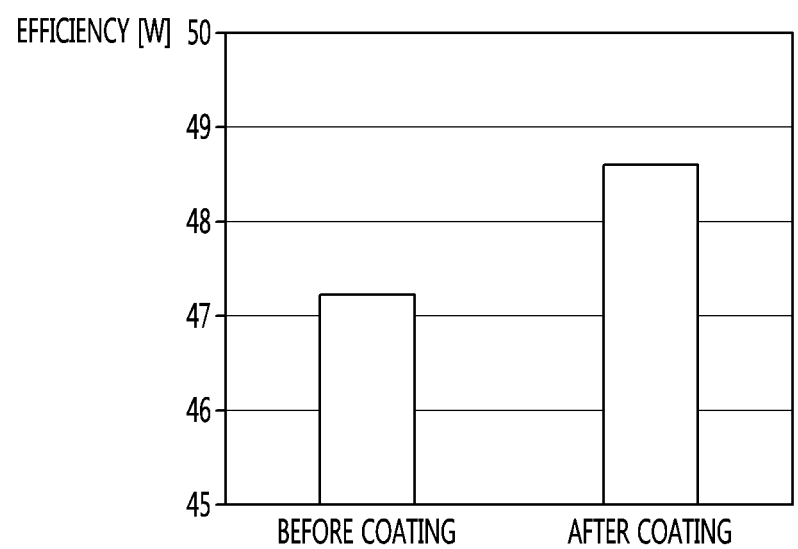
FIG. 6 is a diagram showing fan motor efficiency of an embodiment of the present disclosure and a comparative example.

FIG. 4 is a flowchart of a method of manufacturing a fan motor according to an embodiment of the present disclosure, FIG. 5 is a side view before assembly of a fan motor according to an embodiment of the present disclosure, and FIG. 6 is a diagram showing fan motor efficiency of an embodiment of the present disclosure and a comparative example.

A method of manufacturing a fan motor according to the present embodiment may include an impeller cover manufacturing step S1, an impeller rotating step S2, and an impeller cover coupling step S3.

The impeller cover manufacturing step S1 may be a step of manufacturing the impeller cover 7 by forming a non-metallic coating layer having a first thickness T1 on the inner circumferential surface of the shroud 73 of which an inner diameter expands in the air flow direction.

This impeller cover manufacturing step S1 may be carried out in a preparation process before the assembly of the fan motor, the impeller cover 7 may be provided to the assembly line of the fan motor in a state in which a non-metallic coating layer of the first thickness T1 is formed on the inner circumferential surface of the shroud 73.

The non-metallic coating layer 74 may be a soft material with the strength is 50% or less of the strength of the blade 62.

The blade 62 of the impeller 6 rotated in the impeller rotating step S2 may be made of PEEK.

The non-metallic coating layer 74 coated in the impeller cover manufacturing step S1 may be a Teflon material such as PTFE or ETFE or a silicon material.

The non-metallic coating layer 74 may be electrostatic painted on the inner circumferential surface of the shroud 73. In the electrostatic printing, the first thickness, which is the thickness of the non-metallic coating layer 74, may be in a range from 0.2 mm to 0.3 mm.

The non-metallic coating layer 74 may be coated on the inner circumferential surface of the shroud 73 with the ETFE by the electrostatic printing method.

The detailed coating process of the ETFE non-metallic coating layer 74 may include a process of stirring the ETFE, a process of washing the inner circumferential surface of the shroud 73 to remove oil or foreign substances on the inner circumferential surface of the shroud 73, a roughening process of roughening the inner circumferential surface of the shroud 73, a process of printing a primer (for example, EPW-1606BL) having a thickness of from 15 µm to 20 µm on the inner circumferential surface of the shroud 73, a process of repeatedly printing the stirred ETFE a plurality of times, and a process of performing baking for 30 to 40 minutes at 280° C. to 300° C.

When the non-metal coating layer 74 is coated as described above, the non-metal coating layer 74 may be coated with a uniform first thickness T1 on the inner circumferential surface of the shroud 73.

The impeller rotating step S2 may be a step of rotating the impeller 6 while inserting the impeller 6 having the blade 62 formed on the hub 61 into the inside of the impeller cover 7 as shown in FIG. 5.

During insertion and rotation of the impeller 6, the impeller 6 may be press-fit into the impeller cover 7 while the impeller 6 and the shroud 73 align with the concentric axis O, and the blade tip 65 of the blade 62 may be rubbed with a portion of the non-metallic coating layer 74 to grind a portion of the non-metallic coating layer 74 to a second thickness T2 thinner than the first thickness T1.

In the above grinding process, the non-metallic coating layer 74 may have a first area A1 and a third area A3 that are not ground by the blade 62 and a second area A2 that is ground by the blade 62, and the blade 62 may face the second area A2 in the radial direction.

The second area A2 may be an area recessed to be thinner than the first area A1 and the third area A3, and one end thereof may be stepped with the first area A1 in the air flow direction and the other end may be stepped with the third area A3 in the flow direction.

As described above, when the second area A1 is stepped with the first area A1 and the third area A3, respectively, the boundary portion A12 of the first area A1 and the second area A2 in the first area A1 may cover an outer tip of the leading edge 63 in the axial direction. The outer tip of the leading edge 63 may be a tip furthest from the hub 61 in the leading edge 63. A boundary portion A23 of the second area A2 and the third area A3 in the third area A3 may cover the outer tip of the trailing edge 64 in the radial direction. The trailing edge 64 may be the tip furthest from the hub 61.

The non-metallic coating layer 74 may be formed with a blade tip receiving groove "G" in which at least a part of the blade tip 65 is received between the boundary portion A12 of the first area A1 and the second area A2 and the boundary portion A23 of the second area A2 and the third area A3.

The non-metallic coating layer having the second thickness T2 remains between the blade tip 65 of the blade 62 and the inner circumferential surface of the shroud 73, and the minimum air gap "G" is formed in between the blade tip 65 and the non-metallic coating layer 74.

The impeller cover coupling step S3 may be a step of coupling the impeller cover 7 to the motor housing 1.

The impeller cover 7 may be fastened to the motor housing 1 through an adhesive or a fastening member such as a screw in the state having the air gap "G" as described above, and the air gap "G" between the impeller 6 and the impeller cover 7 may be maintained without expansion.

FIG. 5 shows a diagram comparing fan motor efficiency in a case in which a portion of the non-metallic coating layer 74 is ground with the blade 62 after forming the non-metallic coating layer 74 on the inner circumferential surface of the shroud 73 with fan motor efficiency in a case in which the non-metallic coating layer 74 is not formed, under the condition that the shrouds 73 have the same size.

It can be seen that the fan motor efficiency of the case in which a portion of the non-metallic coating layer 74 is ground with the blade 62 after forming the non-metallic coating layer 74 on the inner circumferential surface of the shroud 73 is approximately 1.4% higher than that of the case in which the non-metallic coating layer 74 is not formed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The invention claimed is:

1. A fan motor comprising:
    a motor housing;
    a rotating shaft disposed in the motor housing;
    a rotor mounted on the rotating shaft;
    a stator that is disposed within the motor housing and that surrounds a circumference of the rotor;
    an impeller comprising a hub connected to the rotating shaft and at least one blade disposed at an outer surface of the hub; and
    an impeller cover that surrounds an outer circumference of the impeller and that defines an air suction port,
    wherein the impeller cover comprises:
        a shroud having an inner diameter that increases as the shroud extends along an air flow direction in the impeller cover, and
        a non-metallic coating layer attached to an inner circumferential surface of the shroud, a strength of the non-metallic coating layer being less than a strength of the blade,
    wherein a maximum diameter of the impeller is greater than a diameter of the air suction port,
    wherein the non-metallic coating layer includes:
        a first area having a first thickness, and
        a second area having a second thickness thinner than the first thickness to thereby define a stepped portion with respect to the first area,
    wherein the non-metallic coating layer includes a synthetic resin material,
    wherein the first thickness is in a range from 0.1 mm to 0.6 mm, and
    wherein the blade faces the second area in a radial direction of the impeller.

2. The fan motor of claim 1, wherein the non-metallic coating layer extends upward of the impeller along the inner circumferential surface of the shroud in an axial direction of the impeller, and wherein the non-metallic coating layer surrounds an entire portion of an outer circumferential surface of the impeller.

3. The fan motor of claim 1, wherein the second area extends from the first area along the air flow direction, and wherein the non-metallic coating layer further includes a third area that has the first thickness and that extends from the second area along the air flow direction.

4. The fan motor of claim 3, wherein the non-metallic coating layer defines a blade tip receiving groove that is recessed from each of a first boundary portion between the first area and the second area and a second boundary portion between the second area and the third area, the blade tip receiving groove being configured to receive at least a part of a blade tip of the blade.

5. The fan motor of claim 1, wherein the second thickness of the second area varies along the air flow direction, and wherein an average thickness of the second area is less than the first thickness of the first area.

6. The fan motor of claim 1, wherein the shroud includes:

a first diameter portion that defines the air suction port;

a second diameter portion having an inner diameter greater than an inner diameter of the first diameter portion; and an expansion portion that connects the first diameter portion to the second diameter portion, the expansion portion having an inner diameter that increases as the expansion portion extends to the second diameter portion, wherein the second area is disposed on each of an inner surface of the first diameter portion and an inner surface of the expansion portion, or the second area is disposed on the inner surface of the expansion portion.

7. The fan motor of claim 1, wherein the blade includes a polyether ether ketone (PEEK) material, and wherein the non-metallic coating layer includes a Teflon material.

8. A fan motor comprising:

a motor housing;

a rotating shaft disposed in the motor housing;

a rotor mounted on the rotating shaft;

a stator that is disposed within the motor housing and that surrounds a circumference of the rotor;

an impeller comprising a hub connected to the rotating shaft and at least one blade disposed at an outer surface of the hub; and an impeller cover that surrounds an outer circumference of the impeller and that defines an air suction port, wherein the impeller cover includes:

a shroud having an inner diameter that increases as the shroud extends along an air flow direction in the impeller cover, and a non-metallic coating layer attached to an inner circumferential surface of the shroud, a strength of the non-metallic coating layer being less than a strength of the blade, wherein a maximum diameter of the impeller is greater than a diameter of the air suction port, wherein the non-metallic coating layer includes:

a first area having a first thickness, and a second area having a second thickness thinner than the first thickness to thereby define a stepped portion with respect to the first area, and wherein the blade faces the second area in a radial direction of the impeller.

9. The fan motor of claim 8, wherein the second area extends from the first area along the air flow direction, and wherein the non-metallic coating layer further includes a third area that has the first thickness and that extends from the second area along the air flow direction.

10. The fan motor of claim 8, wherein a maximum distance between a central axis of the impeller and a blade tip of the blade is greater than a radius of the air suction port.

11. The fan motor of claim 8, wherein the second thickness of the second area varies along the air flow direction, and wherein an average thickness of the second area is less than the first thickness of the first area.

12. The fan motor of claim 8, wherein the shroud includes:

a first diameter portion that defines the air suction port;

a second diameter portion having an inner diameter greater than an inner diameter of the first diameter portion; and an expansion portion that connects the first diameter portion to the second diameter portion, and the expansion portion having an inner diameter that increases as the expansion portion extends from the first diameter portion to the second diameter portion, and wherein the second area is disposed on each of an inner surface of the first diameter portion and an inner surface of the expansion portion, or the second area is disposed on the inner surface of the expansion portion.

13. The fan motor of claim 8, wherein the shroud includes:

a first diameter portion spaced apart from the air suction port; and an expansion portion having an upper end that defines the air suction port and a lower end that faces the first diameter portion, the expansion portion having an inner diameter that increases as the expansion portion extends from the air suction port to the first diameter portion, and wherein the second area is disposed on an inner surface of the expansion portion.

14. The fan motor of claim 8, wherein the blade includes a polyether ether ketone (PEEK) material, and wherein the non-metallic coating layer includes a Teflon material.

15. The fan motor of claim 8, wherein the blade includes a polyether ether ketone (PEEK) material, and wherein the non-metallic coating layer includes an ethylene tetrafluoroethylene (ETFE) material.

16. A method of manufacturing a fan motor, the fan motor including a rotating shaft, an impeller that includes a hub connected to the rotating shaft and a blade disposed at an outer surface of the hub, and an impeller cover that surrounds an outer circumference of the impeller and that includes a shroud having an inner diameter increasing as the shroud extends along an air flow direction in the impeller cover, the method comprising:

attaching a non-metallic coating layer to an inner circumferential surface of the shroud, the non-metallic coating layer having a first thickness;

rotating the impeller relative to the impeller cover while inserting the impeller into the impeller cover; and coupling the impeller cover to a motor housing, wherein the non-metallic coating layer is made of a material having a strength that is less than a strength of the blade, and wherein rotating the impeller relative to the impeller cover comprises grinding, by the blade during rotation of the impeller, a part of the non-metallic coating layer to thereby define an area having a second thickness thinner than the first thickness.

17. The method of claim 16, wherein the blade includes a PEEK material, and wherein the non-metallic coating layer includes a Teflon material.

18. The method of claim 16, wherein the blade includes a polyether ether ketone (PEEK) material, and wherein the non-metallic coating layer includes an ethylene tetrafluoroethylene (ETFE) material.

19. The method of claim 16, wherein attaching the non-metallic coating layer comprises electrostatically printing the non-metallic coating layer on the inner circumferential surface of the shroud.

20. The method of claim 16, wherein the first thickness is in a range of 0.1 mm to 0.6 mm.

* * * * *